United States Patent

Naudet

[11] Patent Number: 6,011,617
[45] Date of Patent: Jan. 4, 2000

[54] SYSTEM FOR INSPECTING INTERNAL ZONES OF A MACHINE BY OPTICAL FIBRE ENDOSCOPY

[75] Inventor: Jacky Naudet, Bondoufle, France

[73] Assignee: Societe Nationale d'Etude et de Construction de Moteurs d'Aviation "Snecma", Paris, France

[21] Appl. No.: 09/199,492

[22] Filed: Nov. 25, 1998

[30] Foreign Application Priority Data

Nov. 27, 1997 [FR] France .................................. 97 14897

[51] Int. Cl.⁷ .................................................. G01N 21/00
[52] U.S. Cl. ........................................ 356/237.1; 356/241
[58] Field of Search ..................................... 356/237, 241

[56] References Cited

U.S. PATENT DOCUMENTS 3,841,764  10/1974  Snell et al. .
4,640,124   2/1987  Diener et al. .
4,905,666   3/1990  Fukuda .................................... 600/146

FOREIGN PATENT DOCUMENTS 2 443 697   7/1980  France .
196 31 970  2/1998  Germany .

OTHER PUBLICATIONS

"Borescope With Large Depth of Focus", NASA Tech Brief, NTIS Tech Notes, Nov. 1, 1990, pp. 993.

H. Huppmann, et al., "Möglichkeiten Und Grenzen Der Endoskopie Bei Grossrevisionen", VGB Kraftwerkstechnik, Vol. 57, No. 9, Sep. 1977, pp. 580–590.

*Primary Examiner*—Frank G. Font
*Assistant Examiner*—Reginald A. Ratliff
*Attorney, Agent, or Firm*—Oblon, Spivak, McClelland, Maier & Neustadt, P.C.

[57] ABSTRACT

A system for inspecting internal zones of a machine, such as an engine, comprises an observation device having an optical fiber endoscope, and distribution and guide means including a network of flexible guide sheaths placed in the machine to define a number of different inspection routes along which the endoscope can be guided from an aperture in the machine wall to various predetermined critical internal zones. Preferably the system includes first electrical means implanted in each guide sheath and co-operable with second electrical means secured to the endoscope in order to detect the position thereof in the network and to transmit the position to a monitoring device outside the machine for monitoring and assisting the guidance of the endoscope in the network.

14 Claims, 5 Drawing Sheets

FIG : 1
PRIOR ART

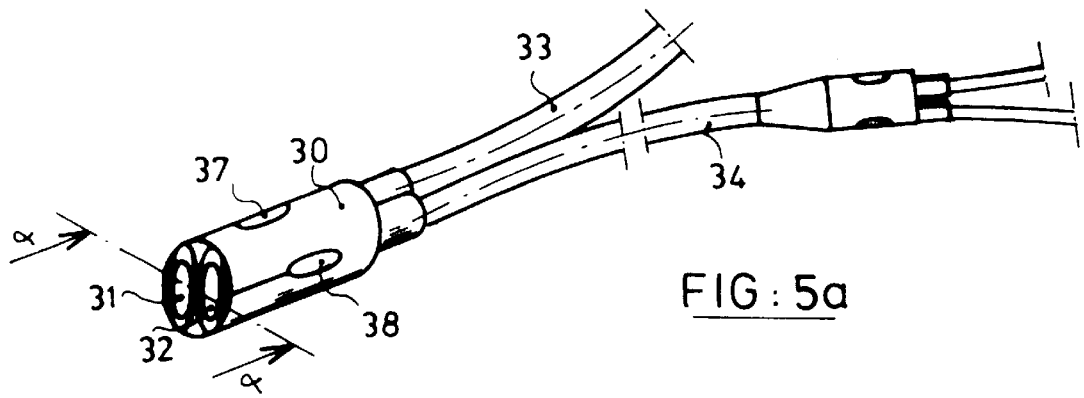
FIG:5a
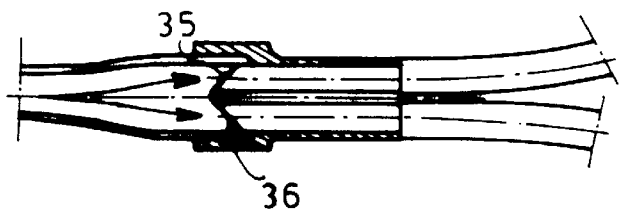
FIG:5b
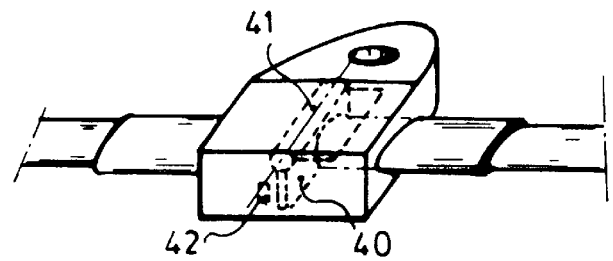
FIG:6
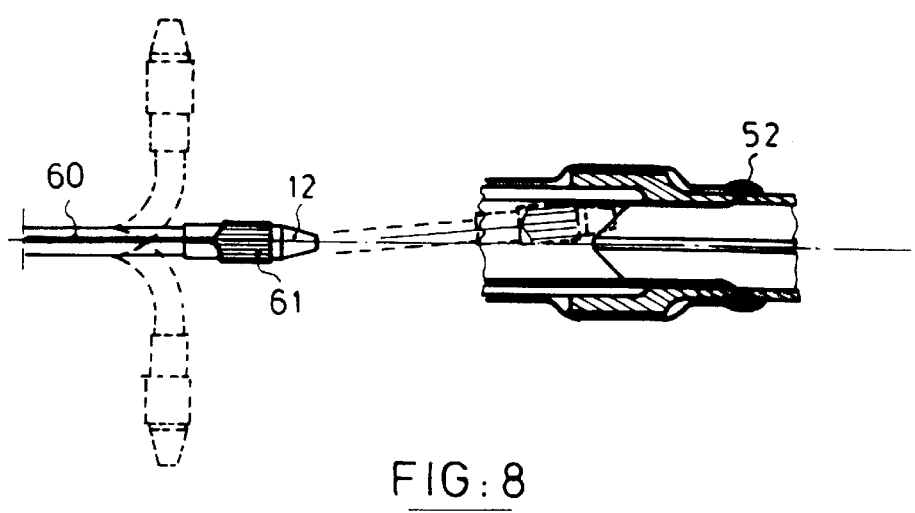
FIG:8

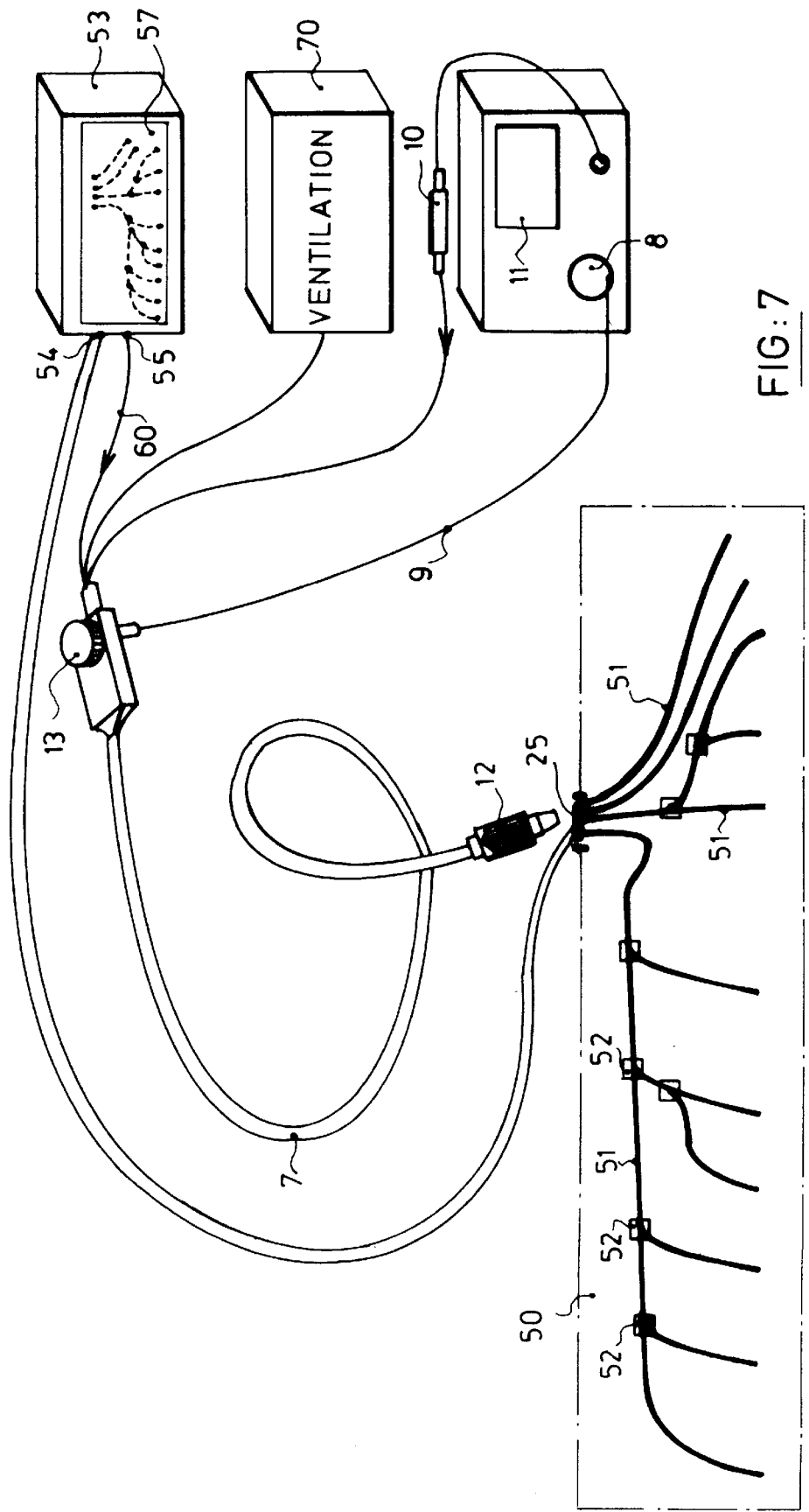
FIG: 7

SYSTEM FOR INSPECTING INTERNAL ZONES OF A MACHINE BY OPTICAL FIBRE ENDOSCOPY

BACKGROUND OF THE INVENTION

1. Field of the Invention

The invention relates to a system for internally inspecting a machine, such as an engine, by optical fibre endoscopy, and is applicable to machines having zones which are inaccessible for inspection and in particular to the turbomachines which form part of aircraft engines.

2. Summary of the Prior Art

In order to inspect internal critical zones of a machine, especially an aircraft engine, it is known to use an endoscope, and French Patent 2 443 697 discloses an example of this. The endoscope is introduced into localised entry apertures in walls and/or partitions of the machine for inspecting zones disposed in the locality of the entry apertures.

FIG. 1 shows a diagrammatic sectional view of an example of a turbomachine compressor provided, in accordance with the prior art, with three entry apertures extended by rigid walled passages for the endoscopy of three different critical zones. The three critical zones 1, 2, 3 to be inspected are stages of bladed discs disposed downstream of the compressor. The entry zones and the rigid walled passages 4, 5, 6 permit the introduction and positioning of an endoscope. Each walled passage enables a single compressor stage to be inspected by endoscopy. The zones which can be inspected are limited since endoscopic examination of a critical zone is possible only when an aperture can be provided near the zone. Also, the engine wall must be formed with a plurality of entry apertures and walled passages if it is to be possible to inspect different internal zones which are remote from one another.

SUMMARY OF THE INVENTION

It is an object of the invention to solve these problems and to provide a system for internally inspecting a machine by optical fibre endoscopy such that it is possible to inspect different internal zones which are difficult to access and are remote from one another from a single entry aperture in a wall of the machine.

To this end, the invention provides a system for inspecting internal zones of a machine having a wall and an entry aperture in said wall, said system comprising an observation device having an optical fibre endoscope and a light source connected to said endoscope, and distribution and guide means for introducing and guiding the endoscope inside the machine, said distribution and guide means including a barrel adapted to be mounted in the entry aperture in the machine wall and having at least one axial orifice with a diameter suitable for the passage of said endoscope, and a network of flexible guide sheaths secured inside the machine between said axial orifice of the barrel and predetermined internal zones of the machine to be inspected, each flexible guide sheath defining a particular inspection route.

Preferably, the system includes first electrical means implanted in each guide sheath and co-operable with second electrical means secured to the endoscope to detect the position thereof in the network and to transmit the position to a monitoring device outside the machine. Detecting the endoscope position in the network of guide sheaths makes it possible to monitor the progress of the endoscope and to help guide it through the network.

Preferably, the inspection system also includes ventilation means for cooling the endoscope and/or the distribution and guide means before and/or during the introduction of the endoscope if the machine to be inspected is not completely cooled.

Other preferred features and advantages of the invention will become apparent from the following non-limitative description of the preferred embodiments with reference to the accompanying drawings.

BRIEF DESCRIPTION OF THE DRAWINGS

FIG. 5a is a diagrammatic perspective view of one example of a branch junction which may be used in the guide sheath network.

FIG. 5b is a longitudinal sectional view of the branch junction.

FIG. 6 is a diagrammatic view of one embodiment of a check valve for use in the guide sheath network.

FIG. 7 shows a diagrammatic representation of an electrical system for detecting the position of the endoscope in the distribution and guide network of an inspection system in accordance with the invention.

FIG. 8 is a diagrammatic sectional view of a detail of the system of FIG. 7 showing the co-operation between a first electrical contact disposed at a branch junction of the distribution and guidance network and a second electrical contact disposed on the head of the endoscope.

DETAILED DESCRIPTION OF THE INVENTION AND PREFERRED EMBODIMENTS

The system in accordance with the invention for endoscopic inspection of internal zones of a machine essentially comprises an observation device having an endoscope connected to a light source and adapted to view critical internal zones of the machine, and at least one distribution and guidance network for the endoscope, the network being mounted in the machine to be inspected and being adapted to guide the endoscope from an aperture in the machine wall to various predetermined internal critical zones.

Preferably, the endoscopic inspection system also comprises an electrical system for detecting the instantaneous position of the endoscope in the network so that the progress of the endoscope through the network can be monitored and the guidance of the endoscope can be assisted.

Also, the endoscopic inspection system may comprise ventilation means for cooling the endoscope and/or the network to enable the endoscope to be introduced into hot parts of the machine before said parts have completely cooled. The ventilation means may be directly connected to the network through the aperture in the machine wall for the introduction of the endoscope. Alternatively, and as shown in FIG. 7, the ventilation means may be connected to a specific ventilation duct introduced, for example, into a protective sheath of the endoscope.

Figure 1:
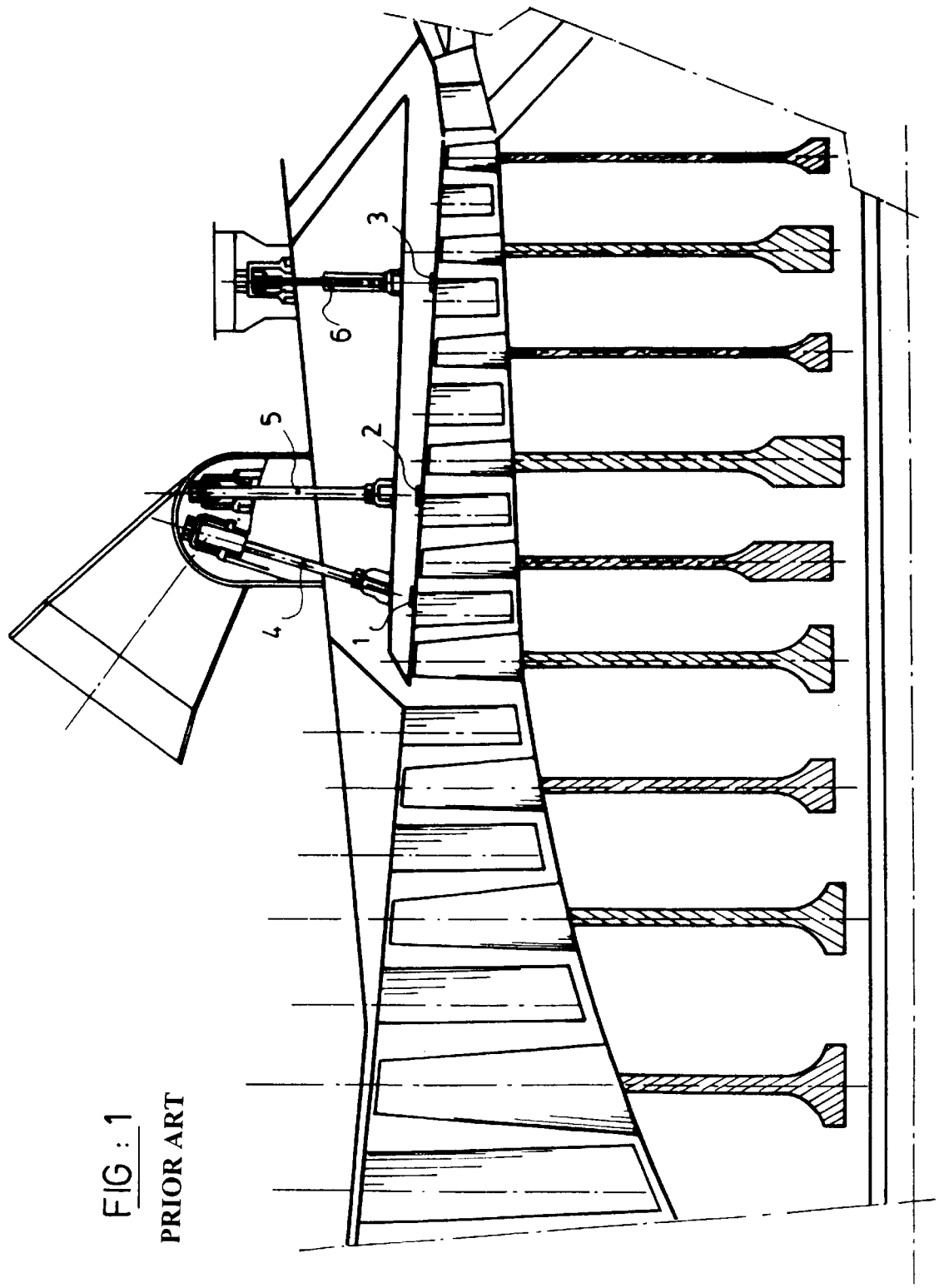
FIG. 1 is a diagrammatic sectional view of one example of a turbomachine compressor provided with three apertures extended by rigid walled passages in accordance with the prior art for endoscopic inspection of three different internal zones of the compressor.
Figure 2:
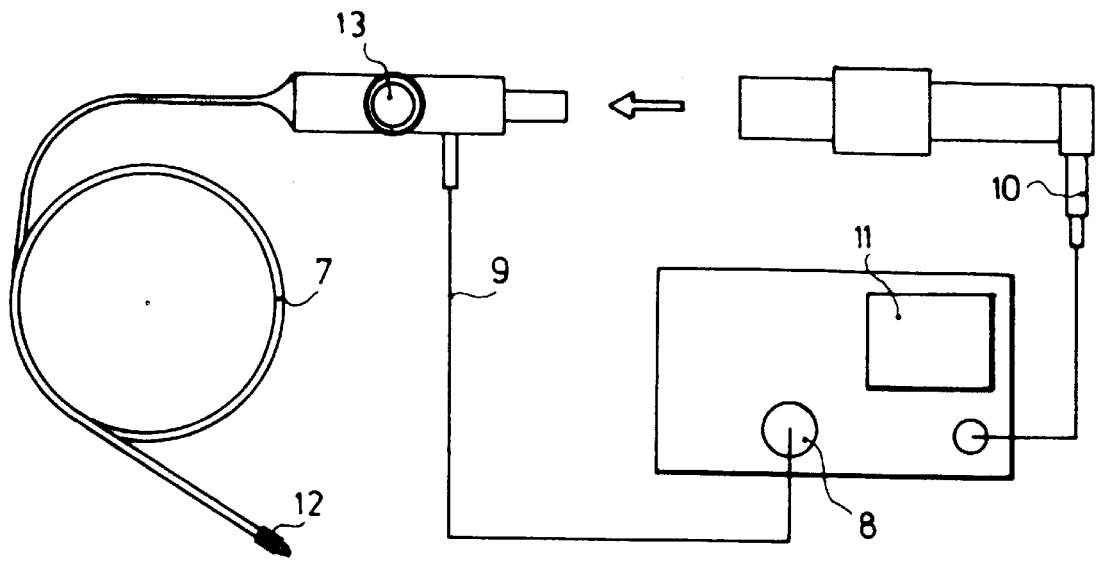
FIG. 2 is diagrammatic view of an example of an endoscope connected to a videoscopic unit for use in a system according to the invention.

FIG. 2 is a diagram showing an example of an endoscope connected to a videoscopic unit for use in a system according to the invention. The endoscope 7 comprises, in known manner, a fibroscope consisting of a bundle of optical fibres encased by a flexible protective sheath. A light source 8 is connected to the endoscope by a light cable 9. The endoscope 7 can be used for viewing with the naked eye or with a photographic camera or with a video camera 10. Preferably, the endoscope is connected to a videoscope unit comprising a video camera 10 and an inspection monitor 11. The images output by the endoscope and received the camera are then displayed in real time on the monitor 11.

Preferably, the endoscope 7 comprises an observation end secured in an orientable endoscope head 12, the orientation of the head being remotely controlled, for example, by means of a manually operated control knob 13.

Figure 3:
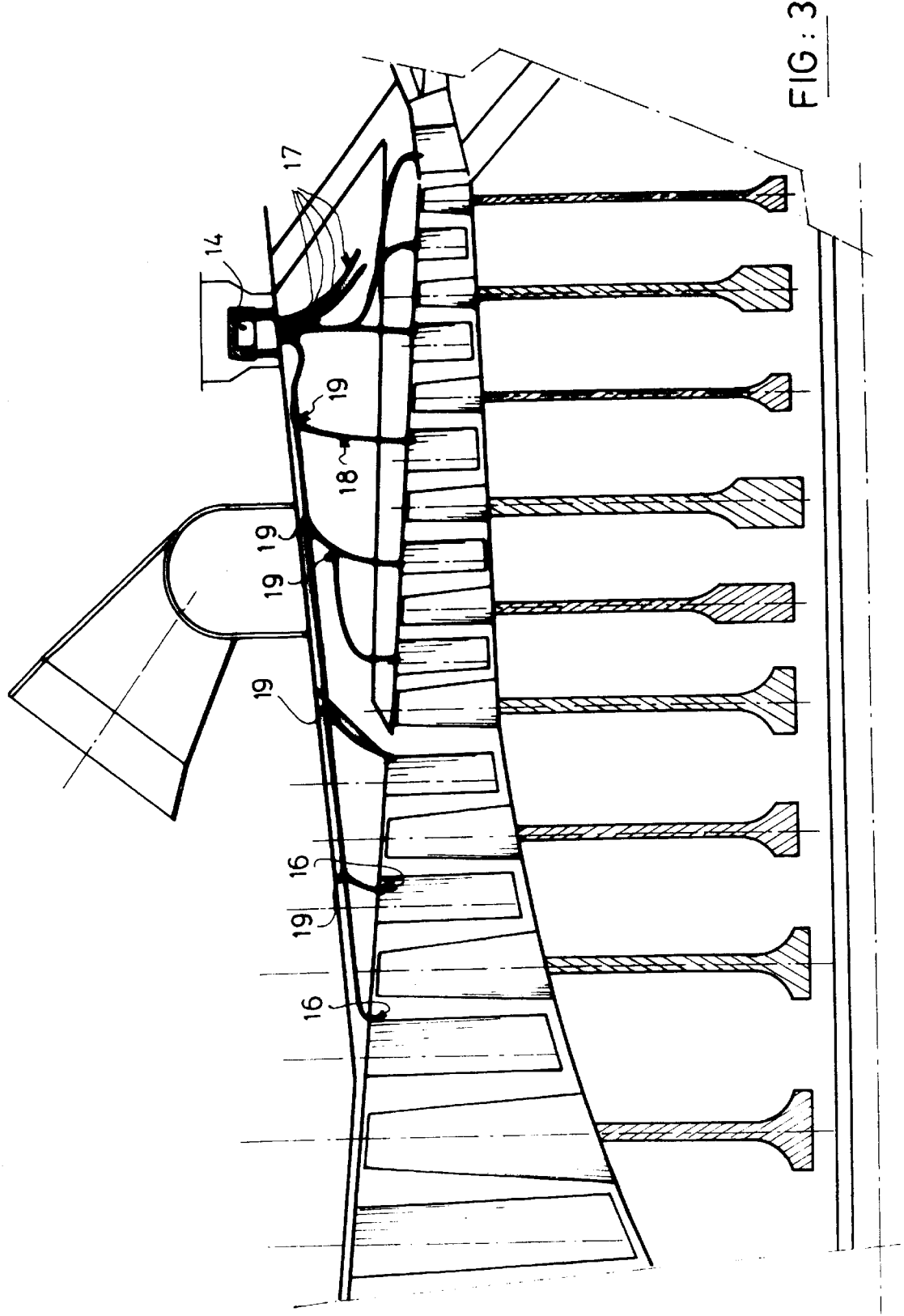
FIG. 3 is a diagrammatic sectional view of an example of a turbomachine compressor provided with the distribution and guide means of one embodiment of the system in accordance with the invention.

FIG. 3 shows a sectional view of an example of a turbomachine compressor fitted with a distribution and guidance network for the endoscopic inspection of internal zones of the compressor.

The network comprises a barrel 14 (described later in detail with reference to FIG. 4) which is inserted in an entry aperture in a wall of the compressor, and a network 15 of flexible guide sheaths disposed within the compressor between the barrel 14 and predetermined internal critical zones 16 which it is required to inspect.

The flexible sheaths may be made of any suitable material, such as plastics or metal, but for the inspection of hot parts of a machine, like the compressor of an engine, the flexible sheaths are preferably made of metal.

The flexible sheaths define a number of possible inspection routes in the turbomachine compressor, each flexible sheath being arranged to guide an endoscope from the barrel as far as a predetermined critical zone which it is required to inspect. The distribution and guidance network comprises first flexible guide sheaths 17 directly connected to the barrel and may also comprise, as shown in FIG. 3, additional flexible guide sheaths 18 branching and/or treeing off from the first flexible sheaths, the additional flexible sheaths extending to further internal zones which it is required to inspect. The distribution and guidance network can therefore be very extensive in a machine to be inspected, enabling a large number of critical zones remote from one another to be inspected from a single entry aperture in the machine wall.

Branch junctions 19, which are shown in FIGS. 5a and 5b, are disposed at each point where an additional guide sheath 18 branches off from a first flexible guide sheath 17 connected directly to the barrel 14 or from another additional guide sheath 18. The branch junctions 19 enable an endoscope to be directed towards one or other of the inspection routes downstream of the junction between the two guide sheaths.

If the distribution and guidance network is disposed in hot parts of a machine, for example, in an engine compressor, it is preferable that the hot gases produced when the engine is running should be kept out of the sheaths in order to prevent damage thereto. To this end, check valves, for example as shown in FIG. 6, are preferably placed in each flexible sheath near the downstream end thereof which opens at the critical zone to be inspected. The check valve may be of the pivoting flap kind, but other types can also be used.

Figure 4:
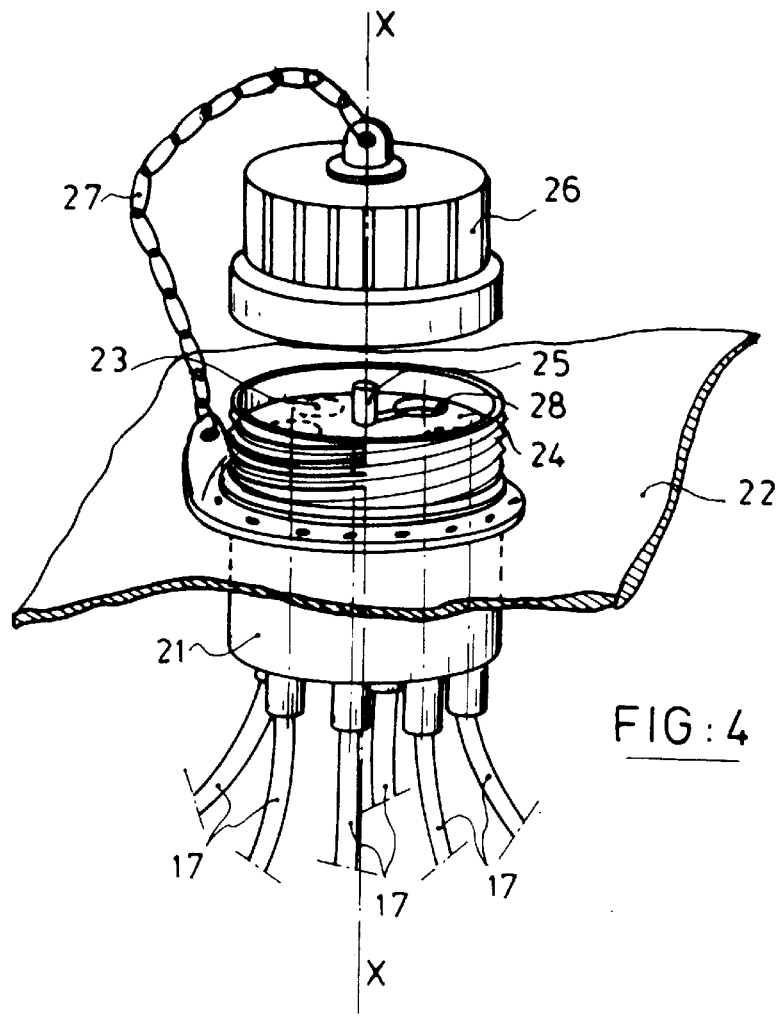
FIG. 4 is a diagrammatic perspective view of one example of a barrel which may be used in the distribution and guide means.

FIG. 4 is a diagrammatic perspective view of one example of a barrel in a system in accordance with the invention. The barrel comprises a cylindrical body 21 which has a longitudinal axis XX' and which is mounted in an aperture in a wall 22 of the machine to be inspected, the body being secured to and supported by the wall 22. Disposed inside the body of the barrel is a barrel component having a plurality of axial orifices 23 of a diameter which will permit the passage of an endoscope, and a rotary shutter 24 for enabling just one of the axial orifices 23 to be opened at a time while the other axial orifices remain closed. The axial orifices 23 are individually connected to flexible guide sheaths 17 which are mounted inside the machine, the number of flexible guide sheaths connected to the barrel being equal to the number of axial orifices in the barrel.

Preferably, the barrel has an electrical terminal 25 disposed, for example, at its centre and serving for the connection of an electrical system for detecting the position of an endoscope introduced into the network of flexible guide sheaths via the barrel.

The rotary shutter 24 is disposed in front of the axial orifices 23 and is provided with a single aperture 28 of a diameter which allows the passage of the endoscope. The shutter aperture 28 can be placed in registration with any chosen axial orifice 23 in order to select a predetermined inspection route and to close off all the other inspection routes.

Preferably, the shutter 24 may have return means (not shown) such as a spring, so that after completing the required inspection of the internal parts of the machine the shutter is returned automatically to a predetermined safety position in which all the axial orifices of the barrel are closed. Closure of all the axial orifices giving access to the network of flexible guide sheaths installed in the machine prevents possible leakages from occurring when the machine is operating.

During inspection the open axial orifice 23 allows the introduction of an endoscope into the distribution and guidance network. The orifice 23 can also be used for the connection of a ventilation device disposed outside the machine and capable of supplying cold air for cooling the network prior to endoscopic inspection. This facility to ventilate the flexible sheaths of the network before the introduction of an endoscope has the advantage of enabling hot parts of a machine to be inspected, without risk of the endoscope being damaged, before the machine has completely cooled.

The barrel also has a closure cap 26 connected, such as by a chain 27, to the body 21 of the barrel. The cap 26 may have a warning device (not shown), for example in the form of a telltale lamp, to ensure that replacement of the barrel closure cap is not forgotten at the end of an inspection operation.

FIGS. 5a and 5b are, respectively, diagrammatic perspective and longitudinal sectional views of one example of a branch junction which may be used in the distribution and guidance network of the invention. The branch junction comprises a cylindrical member 30 which is open at both its entry and exit ends and is formed with two longitudinal ducts 31, 32. A flexible guide sheath 33, 34 is introduced into each duct at the exit end, and a single flexible guide sheath is connected to the member 30 at its entry end. As shown in FIG. 5b, at the entry end each longitudinal duct is bevelled as indicated by references 35, 36, the bevelling being oriented to facilitate the orientation and introduction of an endoscope into the longitudinal duct corresponding to the desired inspection route. Disposed in each duct 31, 32 is an electrical contact 37, 38 forming part of an electrical detection system as described later with reference to FIG. 7.

FIG. 6 is a diagrammatic view of one example of a check valve which may be used in a guide sheath of a system according to the invention. The check valve shown is of the pivoting flap kind comprising a flap 40 which pivots about an axis 41 perpendicular to the longitudinal axis of the sheath. In the closed position the flap closes the sheath in which the check valve is disposed. When the machine or engine is in operation the pressure of the gases in the machine or engine keeps the flap closed so that hot gases cannot enter the distribution and guidance network. When the machine or engine has stopped and an endoscope is introduced along the sheath, the endoscope will push on the flap and cause it to open to permit the passage of the endoscope for inspection of a critical zone facing the exit end of the sheath.

Preferably, the endoscopic inspection system includes an electrical system for detecting the instantaneous position of an endoscope introduced into the network of flexible sheaths so that the progress of the endoscope therethrough can be monitored and its guidance assisted.

An example of an electrical system suitable for detecting endoscope positions is diagrammatically shown in FIG. 7. A ventilation device 70 connected to a ventilation duct inside the endoscope is also shown in FIG. 7. The electrical position detection system comprises first internal electrical means 50 associated with the distribution and guidance network, second electrical means rigidly associated with the endoscope, and an electrical device 53 for monitoring the position of the endoscope in the network. The monitoring device 53 comprises a first input terminal 54 and a second input terminal 55 to which the first and second electrical means respectively are connected.

The first electrical means 50 comprises a system of electrical leads 51, for example in the form of flexible printed circuits, secured along the inside wall of each of the guide sheaths, and first electrical contacts 52 disposed on the leads at predetermined positions disposed near each branch junction, as shown in FIG. 8. At the branch junctions each sheath in the longitudinal ducts of the junction has a first electrical contact disposed on an electrical lead which extends along the corresponding flexible guide sheath. All the leads are connected to a multiway electrical connection terminal 25 secured to the barrel. The terminal 25 is connected to the first input terminal 54 of the monitoring device 53, the terminal 54 also being a multiway terminal.

The second electrical means comprises an electrical lead 60, which may be in the form of a printed circuit, secured along the endoscope and connected at one end to a second electrical contact 61 mounted on the outer periphery of the endoscope head 12 as shown in FIG. 8. At its other end the lead 60 extending along the endoscope is connected to the second input terminal 55 of the monitoring device 53.

The monitoring device 53 comprises telltale lights 56, for example electroluminescent diodes, connected between the two input terminals of the monitoring device 53 by way of electrical circuits (not shown) disposed in the monitoring device. Each telltale light is associated with one of the first contacts 52 in the distribution and guidance network, so that the number of telltale lights is at least equal to the number of the first electrical contacts 52.

The telltale lights are disposed on a display panel 57 including a graphic representation of the distribution and guidance network, the positions of the telltale lights on the graphic representation corresponding to the positions of the first electrical contacts 52 in the distribution and guidance network.

The electrical system for detecting the position of an endoscope introduced into the distribution and guidance network operates as follows.

Whenever the second electrical contact 61 on the endoscope head engages one of the first contacts 52 in the network of flexible guide sheaths during movement of the endoscope through the network, an electrical connection is made between a lead secured to the network and the lead secured to the endoscope, and a corresponding electrical detection circuit is closed so that the telltale light on the graphical representation corresponding to the engaged first contact 52 is caused to light up to indicate the instantaneous position of the endoscope head in the network. When the endoscope is positioned at a branch junction, the illumination of the telltale light makes it possible to check and, if required, to correct the orientation of the endoscope if the latter has entered a sheath which does not belong to the desired inspection route.

I claim:

1. A system for inspecting internal zones of a machine having a wall and an entry aperture in said wall, said system comprising an observation device having an optical fibre endoscope and a light source connected to said endoscope, and distribution and guide means for introducing and guiding the endoscope inside the machine, said distribution and guide means including a barrel adapted to be mounted in the entry aperture in the machine wall and having at least one axial orifice with a diameter suitable for the passage of said endoscope, and a network of flexible guide sheaths secured inside the machine between said axial orifice of the barrel and predetermined internal zones of the machine to be inspected, each flexible guide sheath defining a particular inspection route.

2. A system according to claim 1, wherein said network of flexible guide sheaths comprises at least one first flexible guide sheath directly connected to the axial orifice of the barrel and extending to a predetermined internal zone to be inspected.

3. A system according to claim 2, wherein said network of flexible guide sheaths comprises at least one additional flexible guide sheath which branches off said first sheath and extends to an additional internal zone to be inspected.

4. A system according to claim 2, wherein said network of flexible guide sheaths comprises a plurality of additional flexible guide sheaths which branch off from said first sheath.

5. A system according to claim 3 or claim 4, wherein said network of flexible guide sheaths includes branch junctions at each branch from a flexible guide sheath.

6. A system according to claim 1, wherein each flexible guide sheath is provided with a check valve near its end which opens at the zone to be inspected.

7. A system according to claim 1, wherein said barrel is provided with a plurality of axial orifices which are individually connected to flexible guide sheaths secured inside the machine to define a plurality of possible inspection routes.

8. A system according to claim 7, wherein said barrel also comprises a rotary shutter which is disposed in front of said axial orifices and which is formed with a single hole of a diameter adapted to permit the passage of the endoscope, the shutter being rotatable to place said hole in registration with any one of said axial orifices to select a predetermined inspection route while closing all the other inspection routes.

9. A system according to claim 1, wherein said endoscope has an observation end secured in an orientable endoscope head, and means for remotely controlling the orientation of said head.

10. A system according to claim 1, further comprising an electrical system for detecting the instantaneous position of an endoscope introduced into the distribution and guide means, said electrical system comprising first internal electrical means integral with said distribution and guide means, second electrical means integral with said endoscope, and an electrical device for monitoring the position of the endoscope and comprising first and second input terminals to which said first and said second electrical means are respectively connected.

11. A system according to claim 10, wherein said first internal electrical means comprises first electrical leads fixed along the inside wall of each of said flexible guide sheaths, said first electrical leads being connected to an electrical terminal which is secured to said barrel and is connected to said first input terminal of the electrical monitoring device, and first electrical contacts provided on said first electrical leads at least at each junction within said network of flexible guide sheaths.

12. A system according to claim 10, wherein said second electrical means comprises a second electrical lead fixed along the endoscope, said second electrical lead having one end connected to a second electrical contact secured to the outer periphery of the endoscope head and a second end connected to said second input terminal of the electrical monitoring device.

13. A system according to claim 10, wherein the electrical monitoring device comprises a display panel including a graphical representation of said distribution and guide means, and telltale lights disposed on the display panel and connected between the two input terminals of the electrical monitoring device by way of electrical circuits disposed in the monitoring device, the positions of said telltale lights on said graphical representation faithfully representing the corresponding positions of said first electrical contacts in the distribution and guide means.

14. A system according to claim 1, further comprising ventilating means for cooling said endoscope and/or said distribution and guide means before and/or during inspection of hot parts of the machine.

* * * * *